April 24, 1928.  1,667,120

A. J. KEISER

FEEDING OR DISPLACING BELT

Filed March 21, 1925

INVENTOR.
Arthur J. Keiser
BY Davis & Simms
his ATTORNEYS.

Patented Apr. 24, 1928.

1,667,120

UNITED STATES PATENT OFFICE.

ARTHUR J. KEISER, OF ROCHESTER, NEW YORK, ASSIGNOR TO THE BIRCHER CO., INC., OF ROCHESTER, NEW YORK.

FEEDING OR DISPLACING BELT.

Application filed March 21, 1925. Serial No. 17,364.

The present invention relates to feeding or displacing belts and to a method of making the same. It relates more particularly to that type of belt designed for use in paper machines, envelope openers, and other machines which handle paper or sheet material, or articles made therefrom, and where it is desired to shift the material or articles laterally during the movement of the belt. An object of this invention is to improve that construction of belt which has a circular cross-section and has the portion thereof at its innermost periphery under compression while its outer portion is under tension, so that the belt in addition to moving in an endless path also has a tendency to roll or turn about an endless axis extending through the center of the belt. Another object of the invention is to provide a belt of this type which will have greater length of life due to the fact that it has no transverse seams or joints.

To these and other ends, the invention consists of certain parts and combinations of parts, all of which will be hereinafter described, the novel features being pointed out in the appended claims.

In Patent No. 1,182,054, granted May 9, 1916, to Henry D. Taylor, there is described a belt of circular cross-section with its innermost periphery under compression and its outermost periphery under tension, so that as the belt travels in an endless path it also has a tendency to turn about an axis through the center of the belt, whereby material which is engaged by the belt is caused to be shifted laterally at the same time it is moving with the belt in the direction of travel of the effective portion of the latter. In this Taylor patent the belt was made from a strip of rubber or other material of circular cross section, having its ends cut at right angles and vulcanized together so that when the belt is passed about its driving and guiding pulleys its inner periphery will be under compression while the outer periphery will be under tension. In the use of a belt made in accordance with the method disclosed in the Taylor patent it was found that the twisting or turning during use together with the tension on the belt tended to separate, after a time, the united ends.

Figure 1:
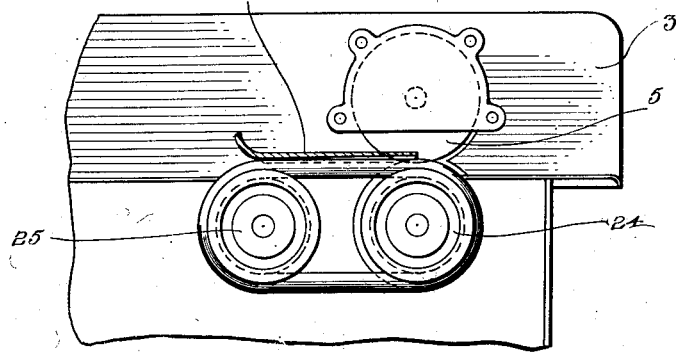
Fig. 1 is a fragmentary view of a machine for opening envelopes for which the present invention may be employed.
Figure 2:
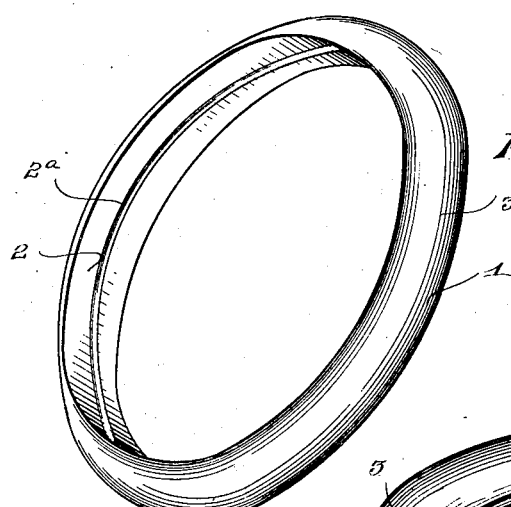
Fig. 2 is a perspective view of one of the ring members employed for making the belt.
Figure 3:
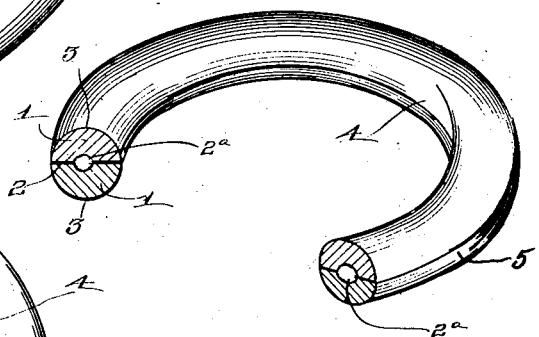
Fig. 3 is a fragmentary perspective view in which the belt is formed from two of the members illustrated in Fig. 2.
Figure 4:
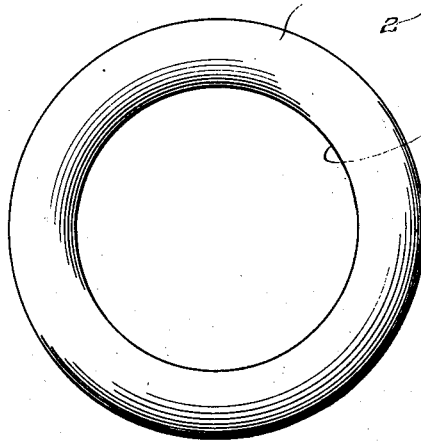
Fig. 4 is a plan view of the belt after being completed.

According to this invention a belt is provided which has no transverse seams or joints. This result is secured, in this instance, by the making of two endless and seamless members 1 of substantially semi-circular cross section, the inner periphery 2 of said members being flat transversely except for a central circumferential groove 2$^a$ while the outer periphery 3 is semi-circular. These two members are then twisted or turned substantially 90°, as shown in Fig. 3, so that the new inner periphery 4 will be under compression and the new outer periphery 5 will be under tension. The flat faces of two members are then cemented or otherwise united together with the result that a single endless member 6, Fig. 4, is provided of circular cross section, and having its innermost periphery under compression and its outermost periphery under tension, thus facilitating the turning of the belt about an axis coincident with the center of the endless belt. The belt may be employed as a feeding or shifting belt for imparting to envelopes, papers and paper articles, or other sheet material or articles, a lateral shifting movement during the movement of the articles with a portion of the endless belt.

The invention is herein illustrated as used in a machine such as shown in the Taylor Patent No. 1,182,054, aforesaid, being mounted on two pulleys 24 and 25 beneath a pressure foot 32 to move envelopes to the cutter 5 along and laterally toward a guide 3. It is to be understood that the invention is not limited to use in letter openers.

The endless belt has no transverse seams or joints and, as a consequence, its life is materially increased. It is preferably formed by a method which employs two seamless and endless members, each preferably having a semi-circular cross section with a flat side substantially midway between the inner and outer periphery of the completed belt, these two members being united through their flat sides by twisting each member so that its flat side intersects both the inner and outer peripheries of the completed belt. The central grooves form a central opening in the belt which tends to increase the resiliency of the belt.

What I claim as my invention and desire to secure by Letters Patent is:

1. An endless belt of the class described, circular in cross section, and having its innermost periphery under compression and its outermost periphery under tension in any position to which it may be turned about the center of said circular cross section, the belt being formed of a plurality of endless and seamless sections.

2. An endless belt of the class described formed from two endless members free from transverse seams or joints, and each having a semi-circular cross section, the flat sides of the two members being united and normally lying before being united, in a position midway between the inner and the outer peripheries of the completed belt.

3. The method of making an endless belt of the class described, which consists in providing two seamless and endless members each having a substantially semi-circular cross section with a flat side lying midway between the inner and the outer periphery of the completed belt, twisting said members 90° to cause the flat sides to intersect the inner and outer peripheries of the completed belt, and uniting the flat sides while they are so positioned, to provide an endless belt, seamless in the direction of its length, circular in cross section, and having its innermost periphery under compression and its outermost periphery under tension.

4. An endless belt of the class described, formed from two endless and seamless members and having semi-circular cross-section with grooves in the flat sides thereof, the flat sides of the members being united in one plane, and said belt having its innermost periphery under compression and its outermost periphery under tension in any position to which it may be turned about the center of its circular cross section.

ARTHUR J. KEISER.